US005537832A

United States Patent [19]
Keus

[11] Patent Number: 5,537,832
[45] Date of Patent: Jul. 23, 1996

[54] FREEZE CRYSTRALLIZATION FOR THE REMOVAL OF WATER FROM A SOLUTION OF DISSOLVED SOLIDS

[75] Inventor: Arie Keus, Lynn, Mass.

[73] Assignee: Waterworks International, Inc., Maynard, Mass.

[21] Appl. No.: 538,954

[22] Filed: Nov. 2, 1995

Related U.S. Application Data

[60] Continuation of Ser. No. 397,638, Mar. 2, 1995, abandoned, which is a division of Ser. No. 63,735, May 20, 1993, Pat. No. 5,394,706.

[51] Int. Cl.⁶ ..................................................... B01D 9/04
[52] U.S. Cl. ................................................. 62/544; 165/94
[58] Field of Search ....................... 62/303, 544; 165/94, 165/95

[56] References Cited

U.S. PATENT DOCUMENTS

| | | | |
|---|---|---|---|
| 2,816,822 | 12/1957 | Hess et al. | 62/532 |
| 3,049,889 | 8/1962 | Carfagno . | |
| 3,248,890 | 5/1966 | Oman | 62/544 |
| 3,344,616 | 10/1967 | Owen | 62/532 |
| 3,400,548 | 9/1968 | Drayer | 62/123 |
| 3,406,741 | 10/1968 | Leach | 165/94 |
| 3,410,335 | 11/1968 | Malmstrom et al. | 165/94 |
| 3,885,399 | 5/1975 | Campbell . | |
| 4,091,635 | 5/1978 | Ogman | 62/123 |
| 4,314,455 | 2/1982 | Engdahl . | |
| 4,468,930 | 9/1984 | Johnson | 62/544 |
| 4,475,355 | 10/1984 | Tinssen et al. | 62/544 |
| 4,551,159 | 11/1985 | Goldstein . | |
| 4,718,480 | 1/1988 | Kito et al. | 165/94 |
| 5,102,544 | 4/1992 | Roodenjls | 62/544 |

FOREIGN PATENT DOCUMENTS

150902 2/1932 Switzerland .

*Primary Examiner*—Ronald C. Capossela
*Attorney, Agent, or Firm*—Howrey & Simon; Richard S. Meyer; W. Jackson Matney, Jr.

[57] ABSTRACT

A freeze crystallization concentration system is disclosed for separating a liquid feed stream into a more purified liquid and a concentrate in which only a single pass through a freeze-crystallizer and ice separator is required. The crystallizer, which converts the initial feed stream into a slurry of ice and concentrate, includes a scraped surface heat exchanger that produces, pumps and removes an ice slurry and uses a secondary cooling system to ensure that the crystallizer will operate in any required position and is not sensitive to motion. The separator includes a rotating drum which separates the ice crystals from the surrounding concentrate by the use of centrifugal force and without the use of screens or filters. An auger, rotating at a different speed than the drum, may be located at the center of the drum for removing the ice crystals. A second drum, attached to the first drum, removes the concentrate with a stationary pivot tube under pressure created by the centrifugal force, without the concentrate being exposed to air. The ice crystals can then be conducted to the wash column to be separated from the remaining concentrate, grown and melted into pure water. The concentrate exiting the separator can be either removed from the system or a small amount can be diverted back to the crystallizer to be mixed with the feed stream from the wash column if a higher concentration is required.

7 Claims, 7 Drawing Sheets

Fig_1

FREEZE CRYSTALLIZATION FOR THE REMOVAL OF WATER FROM A SOLUTION OF DISSOLVED SOLIDS

This application is a continuation of application Ser. No. 08/397,638, filed Mar. 2, 1995, now abandoned, which is a division of application Ser. No. 08/063,735, filed on 20 May 1993 now U.S. Pat. No. 5,394,706

BACKGROUND OF THE INVENTION

The invention relates generally to freeze crystallization concentration systems, which are used to separate water from a solution in which solids are dissolved or suspended. More particularly, the invention relates to improved freeze crystallization apparatus and methods utilizing a single pass or one-step crystallization process that is more efficient and economical than existing systems.

The use of freeze-crystallization concentration systems to separate liquid feed streams into a more purified liquid and a concentrate is known. These systems have many uses, including conversion of a contaminated waste water stream into fresh water and concentrate, desalination of sea water, concentration of solutions or suspensions containing food such as orange juice or coffee, and separation from solution of chemicals having different freezing points. In some of these cases, the desired product is purified water, which can be obtained by melting the ice formed in such systems, but in other cases the desired product is the concentrate.

Freeze-crystallization concentration processes operate by taking advantage of the scientific principle that ice crystals, as they freeze, exclude dissolved impurities, including organics, inorganics and volatiles. Thus, the resulting ice crystals consist of purified water.

Generally, freeze-crystallization systems include at least one freeze-crystallizer to form ice crystals and a concentrate, and at least one wash column to separate ice from concentrate and to wash the surface of the ice crystals. Systems which include only one freeze-crystallizer and one wash column are referred to as single stage or one-step systems.

Systems have been employed using two freeze-crystallizers and two wash columns, which are referred to as two-stage systems. One example of a two-stage freeze-crystallization system is described in U.S. Pat. No. 3,885,399 to Robert J. Campbell. The system described in this patent recycles concentrate from the first-stage wash column and uses the recycled concentrate as wash water in the second-stage wash column. Another two-stage freeze crystallization system is described in U.S. Pat. No. 4,091,635 to Abraham Ogman. This patent employs two separate crystallizers, both of which cool the incoming feed stream by direct injection of immiscible secondary refrigerants into the feed. The pressure in the crystallizer is maintained such that the refrigerant can vaporize, withdrawing sufficient heat from the input feed to cause ice crystal formation.

One of the major problems in prior freeze concentration systems has been removing the ice crystals from the concentrate. This problem intensifies with increasing concentration and viscosity. Many methods have been tried or proposed to overcome this problem, but have met with dubious success. For instance, in most cases, use of a one-step system in which the feed stream passes through the freeze-crystallizer only once is insufficient to produce the desired concentration. Thus, it has been proposed to use a second freeze-crystallizer in a two-stage system or to send some of the concentrate back to the first freeze-crystallizer without any ice crystals in the feed stream.

One of the major problems with the two-stage solution lies in duplication of expensive equipment required in two-stages systems, such as wash columns, filters or centrifuges, and refrigeration systems, which results in heat loss and increases the energy cost per pound of water removed. Another problem with two-stage systems is their limited ability to treat highly contaminated feed streams. One reason for this is that when the concentration of the feed stream is relatively high, the ice crystals produced are relatively small and therefore difficult to wash. (The rate of ice crystal growth is inversely proportional to the concentration of the surrounding liquid.) Solutions to this problem, such as diluting the feed, increasing retention time in wash columns, building larger wash columns, providing finer filters and better screens in centrifuges, also result in excessive energy consumption or increased capital costs.

Another significant problem in freeze crystallization systems of the either one- or two-stage variety has been the costly and inefficient design of the freeze-crystallizer apparatus itself. Indirect freeze crystallizers in which the coolant is maintained separate from the feed have been built and patented in many forms. Most common have been the scraped-surface heat exchangers or falling-film heat exchangers, which typically use either rotating motors or hydraulic pressure of the liquid as the driving force. All of these designs have severe limitations including a limitation of the amount of ice crystals produced in a single pass, which at its best has been an ice fraction of about 40%. Rotating scraper crystallizers must be very large by design and hydraulically-driven crystallizers, including the falling film variety, are constrained to particular spatial orientations. The falling film type must operate in a vertical position with the feed stream entering at the top; it is also sensitive to the viscosity of the liquid it processes. Hydraulically-driven shell and tube crystallizers must be operated in a horizontal position. Shell and tube freeze-crystallizers that cool the feed stream by direct injection of the refrigerant into the feed, such as disclosed in the above-mentioned U.S. Pat. No. 4,091,635, suffer from several additional drawbacks. The use of the direct refrigerant, which creates increased pressure in the shell that fluctuates depending on whether the device is being operated, requires a thick tube wall design, with the attendant low heat transfer efficiency, and low density of tubes per area, resulting in a large overall size.

As a result of the foregoing problems, there are very few freeze concentration systems that can compete with other separation processes known in the industry, such as distillation, electro-dialysis or reverse osmosis, which are commonly known but expensive methods for removing water from a solution containing dissolved solids like salts and other minerals. Many projects in which freeze concentration systems could have been used successfully have failed because of the above-noted problems, which have restricted the use of such freezing processes and prevented their commercial application.

SUMMARY OF THE INVENTION

The invention solves these problems by providing a more efficient, cost-effective and reliable apparatus and method for separating water from a solution containing dissolved solids by freeze crystallization than heretofore feasible. More particularly, this is accomplished by the use of a single-stage freeze crystallization process in which an improved freeze-crystallization apparatus for creating a slurry of ice crystals and liquid concentrate, and an improved separator for removing the ice crystals from the concentrate are employed.

The freeze-crystallization apparatus creates ice crystals at a minimum cost and maximum efficiency by combining the required pumping and scraping forces into a single drive. The freeze-crystallization apparatus uses an indirect cooling process with a secondary cooling media, which results in lower pressure within the shell, closely-spaced tubes, thinner tubing walls for more efficient heat transfer, and can operate in any position or orientation. This is especially important when the apparatus is used on a seafaring vessel. The freeze-crystallization apparatus of the invention produces a high percentage of ice crystals on a single pass, such as up to about 50% or more ice fraction, thereby eliminating the need for recirculation.

The ice separation apparatus of the invention solves the ice removal problem by extracting ice crystals from the slurry at a high percentage, such as up to about 95% separation, without the use of costly screens or filters. This is accomplished with a screen-less centrifuge that removes the concentrate without any exposure to air. (Most concentrates are subject to foaming in the presence of air, which, typically requires additional apparatus and expense to reduce, as is evident, for example, from FIGS. 2–3 of U.S. Pat. No. 4,036,619 to Ganiaris.) The ice crystals are removed by a scraping mechanism, such as an auger that rotates inside a rotatable drum forming the centrifuge, but at a slightly different speed.

The freeze-crystallization and ice separation apparatus of the invention obviously may be used separately or in combination with other freeze concentration apparatus or processes; however, the maximum benefits of the invention may be obtained when they are used in conjunction in a single pass process as described herein.

An input feed stream, such as salt water or fruit juice, passes through a wash column of any conventional, known design where the feed stream is pre-cooled by the ice crystals from the separator entering the wash column near the bottom. The feed stream is enriched in concentration by the washed off concentrate that enters the feed with the ice crystals, and is conducted to the chamber of the freeze-crystallization apparatus where it is pumped through one of several tubes. The tubes of the crystalizer are arranged as a bundle within a shell. The feed stream is pre-cooled but ice-free at this point. A secondary cooling media (brine), cooled by a refrigerant, flows around the tubes, cooling the tube surfaces such that ice crystals form within the feed stream are pumped through the tubes. As the feed is pumped through the tubes, scrapers attached to the pumping mechanism simultaneously scrape the ice from the inner tube walls to maintain a flow of slurry of ice crystals and concentrate.

The slurry is subsequently passed into the ice separation apparatus of the invention, which is a rotating drum. The rotation of the drum acts as a centrifuge, separating the ice crystals from the higher-density concentrate that is forced to the outside of the drum. An ice scraping mechanism, such as an auger, is disposed within the drum and may be aligned for rotation along its longitudinal axis to scrape the ice crystals, separating them from the concentrate. The ice crystals removed by the augur are conducted through the wash column, counter current upwards to the feed, and are prevented from conglomerating by pin mixing rods until the ice crystals reach the level where the feed stream enters the column. The ice crystals will then form a pack which will rise above the liquid level and continue to rise until it reaches the top of the column to be removed by a conventional scraper. During the rise, water created from molten ice will be sprinkled on top of the ice pack and drain into the liquid zone, washing off any remaining concentrate. The ice crystals may then be melted to pure water.

DETAILED DESCRIPTION

For purposes of the description contained herein, the following terms are defined as follows:

Feed Stream: This is the input to the system and may be contaminated water, sea water, brackish water, industrial waste water, chemical process streams containing salts or other chemicals in suspension or solution, suspensions or solutions of food such as orange juice or coffee. etc. Generally, the feed stream will be an aqueous solution, but the term (and the invention) is not limited to aqueous solutions and also includes non-aqueous solutions containing solvents that can be freeze-crystallized.

Concentrate: This is the liquid portion of slurry produced by a freeze-crystallizer, and may consist of brine, liquor of industrial waste, food solutions or suspensions, or any other suitable solution of suspension containing dissolved solute or dispersed particles.

Dilute or Concentrated: These are relative terms which refer to the weight percentage of impurities, contaminates, salts, food or other dissolved solutes in a feed stream or concentrate.

Figure 1:
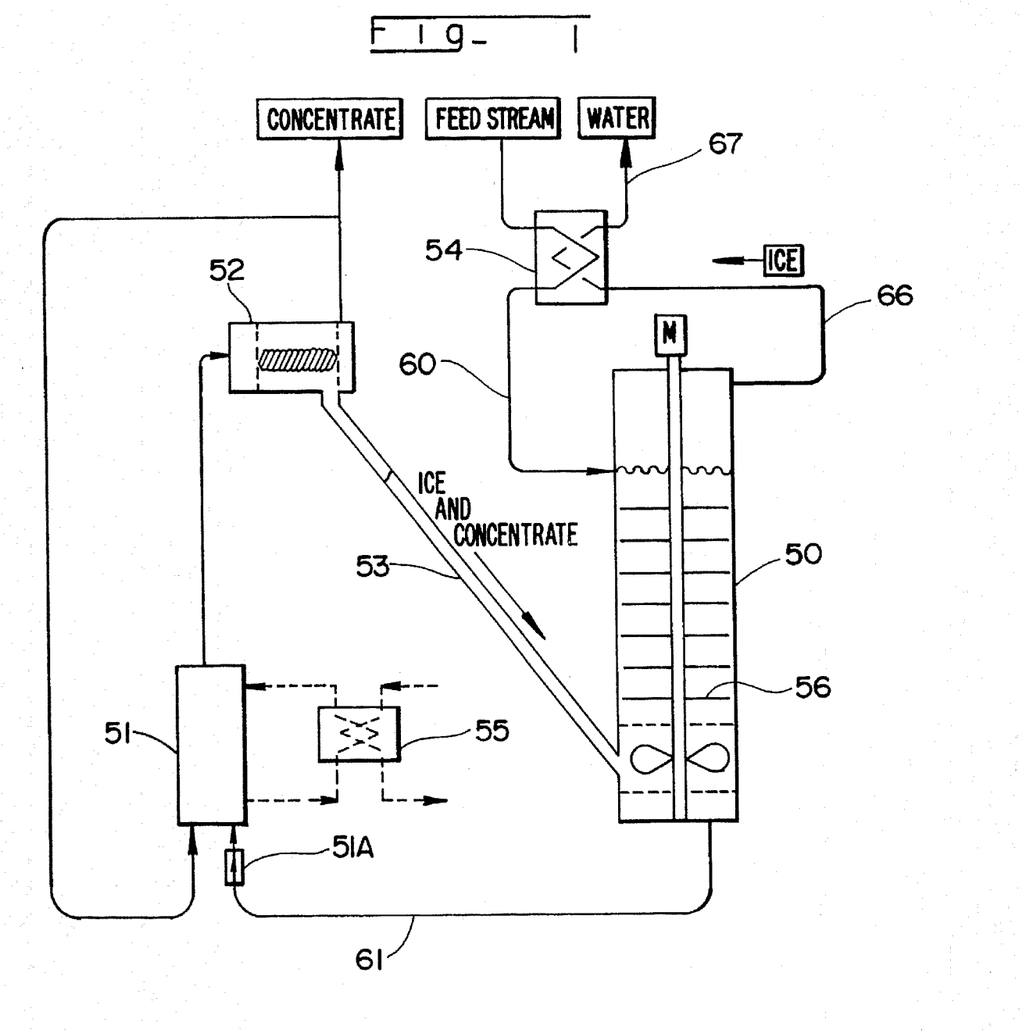
FIG. 1 is a schematic flow diagram illustrating the freeze-crystallization concentration process of the invention.

The single-stage freeze crystallization concentration system of the invention is shown in schematic form in FIG. 1. Ancillary equipment that may be necessary for operation of the system but not needed to explain the principles of the invention, such as pumps, valves, and the like, has not been shown nor described herein for purposes of clarity in illustrating the invention. It will be recognized by those skilled in the art that such ancillary equipment would, of course, be used in combination with the apparatus described and claimed herein.

As is typical of freeze crystallization concentration processes, the feed stream to be concentrated (which may also be referred to herein as the feed) is conducted via a line 60 to a heat exchanger or other conventional cooling apparatus 54 where it is pre-cooled, but should be ice-free. From heat exchanger 54, line 60 conducts the feed stream to the inlet of a wash column 50, which may be of any conventional design known in the art. The feed is conducted through the wash column where it is mixed with a slurry of predominantly ice crystals and a small amount of concentrate, as explained in more detail subsequently.

Line 61 conducts the enriched feed stream from the wash column 50 to the crystallizer 51 of the invention. The feed will be further cooled in the wash column but should still be ice-free prior to entering the crystallizer. A small amount of ice in the feed stream at this point would be operable, but would interfere with the system's efficiency. Once in the crystallizer 51 the feed is further cooled by any conventional and well-known refrigeration means 55, which may comprise a coolant such as brine circulated between a series of bundled tubes disposed within the crystallizer shell as described in more detail subsequently. Pure ice crystals form on the inner walls of the tubes, and are scraped off to create a slurry of ice crystals and concentrate. The partially-crystallized slurry, which may have an ice fraction of up to 50% or higher when treated in the crystallizer of the invention, is then conducted to the separator 52 of the invention, where centrifugal action separates the ice crystals from the higher-density concentrate. The concentrate or a portion thereof may be recycled back to the crystallizer or completely removed from the system at this point. The ice crystals, which typically contain only a small percentage, e.g., 5%, of concentrate after a single pass through the separator of the invention, are conducted along line 53 with the help of an auger to the bottom of the wash column 50.

The ice crystals enter near the bottom of the wash column 50 while the cooled feed stream enters through line 60, closer to the top of the wash column, at the liquid level. The slurry of ice crystals and the feed stream is mixed in the wash column by pin mixing rods 56, which allow the less-dense ice crystals to float upward and grow by contact with feed stream. The feed stream mixed with the higher-density concentrate settles toward the bottom, where it is conducted through line 61 to the inlet valve of crystallizer 51. The ice in the wash column, rising above the liquid level, is washed and scraped from the top of the wash column by conventional means, and conducted from the wash column through line 66, after which it is melted to produce purified water. The heat exchanger 54 uses the energy of the melting ice to pre-cool the incoming feed stream.

The crystallizer 51 of the invention is essentially a scraped-surface heat exchanger that produces, removes, and pumps ice crystals in a more economical and energy efficient manner than heretofore feasible. The crystallizer 51 is shown in greater detail in FIG. 2, which is a longitudinal view shown partly in section (rods 15 and valve system 16A are shown in perspective). The main body of the crystallizer is made from an outer shell 1, a tube sheet 2 on the feed or product inlet side, a tube sheet 3 on the slurry discharge side, and a plurality of tubes 4 disposed inside the shell 1 and having ends supported by the tube sheets 2, 3. The inner surface of the tubes 4 are polished to facilitate ice scraping and slurry flow. An inlet head 8 and outlet head 12 are provided at each distal end of the crystallizer and define, with the tube sheets 2 and 3, respectively, an inlet chamber having an inlet A and outlet chamber having an outlet B. The feed stream from the wash column is conducted into inlet A and through the tubes 4, where ice crystals form, and the resulting ice/concentrate slurry is pumped from the crystallizer via outlet B in a manner described more fully below. The crystallizer may be supported at the inlet and outlet heads in any manner known in art, such as by conventional Victaulic couplings 13, as showing in FIG. 2.

Figure 2:
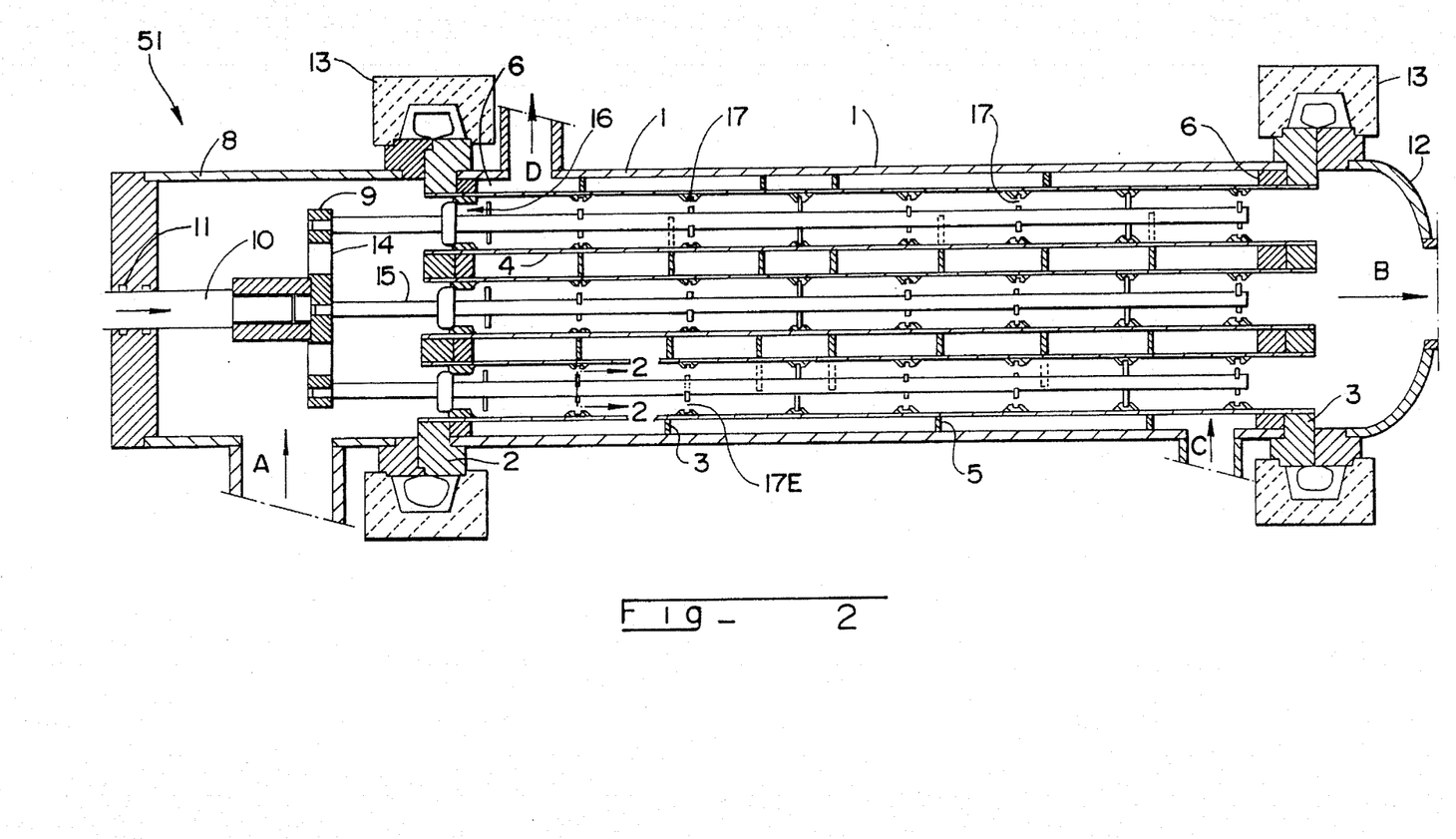
FIG. 2 is a longitudinal, partial sectional view of a freeze-crystallization apparatus constructed according to the principles of the invention (hereinafter referred to as the "crystallizer.")

The tubes 4 are surrounded by a plurality, of baffles 5, which may support the intermediate portions of the tubes. The series of baffles 5 are mounted within the shell to direct the flow of the separate cooling media in a zig-zag pattern around the tubes 4, insuring full contact with the exterior of the tubes 4 and making it possible to operate the crystallizer in any position or orientation.

The cooling brine enters the crystallizer via an inlet opening C in the shell 1 and flows in a zig-zag direction opposite to the flow through the crystallizer until it exits via outlet D. Using a secondary cooling media maintained separately from the feedstream in the crystallizer allows the feed to flow at lower pressure than with designs employing direct injection of pressurized refrigerant into the feed stream to create ice crystals. This permits the use of more closely-bundled tubes, having thinner walls, and thereby promotes more efficient heat transfer and freezing of the feed stream. The baffles 5 promote maximum heat transfer at a very low pressure drop, and insure that, regardless of orientation, the shell will be filled with cooling media that will continue to cool the feed at the same rate as designed.

Insulating layers 6 are provided to prevent freezing outside of the tube sheets 2, 3. The insulating layers may be formed from any known insulating material, such as silicon rubber. Layers 6 are disposed against the inner sides of the tube sheets 2, 3 at the ends of the tubes 4 and are located between adjacent tubes 4, and between the shell 1 and the outermost tubes 4.

The pumping and scraping mechanism employed in the crystallizer will now be described. Positioned axially within each tube 4 is a rod 15. Each rod 15 is fixed at its end to a reciprocating plate 9, which is connected on its opposite side to a shaft 10. Shaft 10 enters the inlet head 8 through a sealed opening 11, and is connected to a conventional drive motor, piston or other mechanism (not shown) that imparts a back-and-forth or reciprocal motion to the shaft 10, the plate 9, and the rods 15. As will be seen, this single drive mechanism supplies the necessary motion for both simultaneously pumping the concentrate through the tubes and for scraping the ice that forms along the inner surface of the tubes. The inlet head 8 is large enough to permit the plate 9 to reciprocate through its full range of motion. Plate 9 contains holes 14 that permit the feed stream entering the inlet A to flow freely through the plate.

A series of scraper mechanisms 17 are mounted at equally-spaced intervals along the length of the rods 15, which extend the full length of the tubes. The scraper mechanisms 17 are illustrated in more detail in FIGS. 3–6 and FIG. 3A, which more clearly show the structure of the scrapers. Each scraper includes a driving pin 17B disposed perpendicular to the rod 15, and an annular scraper ring 17A with an annular groove 17E receiving the driving pin 17B. The driving pin may be connected to the rod in any suitable fashion such as being inserted through a hole bored in the rod. The scraper ring, which may be constructed as a piston ring, is preferably made of a low-friction, plastic material, with enough elastic memory to continue a produce a force against the inside diameter of tube 4. Ring 17A has scraping edges 17C on both sides of the ring. As shown best in FIG. 3A, between edges 17C is an undercut, middle portion 17D, which is spaced from the inner surface 4A of the tube 4 to reduce friction therebetween. The undercut portion 17D of the scraper forms an annular chamber 17G with the inner surface 4A of the tube and the edges 17C. A series of small holes 17F are provided around the circumference of the middle portion 17D, which communicate the chamber 17G with the annular groove 17E. In this manner, any ice crystals flowing past the edges 17C into chamber 17G may be conducted via holes 17F and annular groove 17E to rejoin the main slurry flow conducted through the open center of the scraper ring 17A. The annular groove 17E is stepped to retain pin 17B with a small clearance between the distal ends of pin 17B and the outside of groove 17E, leaves ring 17A to rotate freely, and since more than 2 holes 17F are provided in each ring 17A the flow of ice crystals will not be impeded.

Figure 2A:
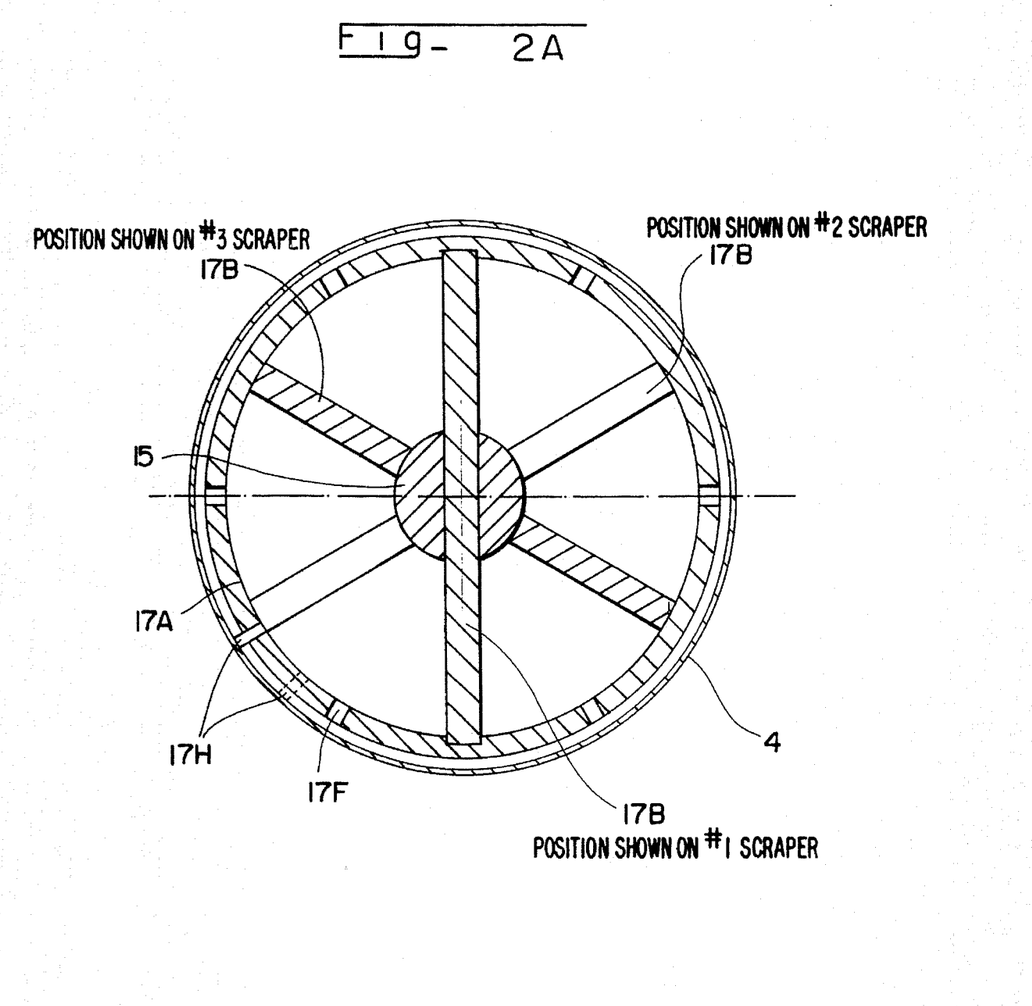
FIG. 2A is a sectional view of a scraper taken along lines 2—2 of FIG. 2.

The scraper rings 17A should fit snugly within the tubes, so that the scraping edges 17C of the tings are maintained in contact with the tube. This may be accomplished by an interference fit in which the scraping rings are split-type piston rings, by groove 17H, that are assembled to the rod prior to insertion into tube 4, thereby ensuring that the rings are biased against the inner surface of the tube for complete ice removal. The scraper mechanisms are spaced along the rod so that the area scraped by one scraper ring at the end of each reciprocal stroke overlaps with the area scraped by the adjacent scraper ring by an amount equal to at least one-half the width of the rings. In this way the entire inner surface of the tube 4 will be scraped completely on each stroke of the rod, with only a small loss of driving energy. The actual length and number of scrapers are conventional design considerations to be determined for each product application. The driving pins may be orientated at different angles along equally-spaced diameters of the tube 4, as illustrated best in the sectional view of FIG. 2A, to promote even slurry flow. For purposes of clarity only, FIG. 2 shows a perspective view of the pins 17B in which the ends of the pins are not illustrated as being retained within grooves 17E; however, it is understood from FIGS. 2A, 3–6, and 3A that each pin is retained in a groove of a corresponding scraper ring.

Also mounted to each rod at the forward end is a pump 16. The same reciprocal motion of the rod that drives the scrapers also generates the pressure to pump the concentrate and ice slurry through the tubes and eventually through the slurry discharge head 12. The structure and operation of the pump can be seen in greater detail with reference to FIGS. 3–6. Each pump includes a valve plug 16A fixedly mounted to the rod 15 between two retaining rings 16B. A driving pin 16D is mounted to the rod 15 a short distance from the plug. Between the valve plug 16A and the pin 16D is located an annular, floating valve seat 16C. The floating valve seat 16C is similar in structure to the scraper rings 17A, but the floating seat is not fixedly mounted to the rod 15 by a pin or other means; it is connected via a lost-motion connection described below. Seat 16C is not a piston ring but a close fitted ring with a scraper edge; there will be very little or no ice to be scraped at this early location in the tube 4.

Figure 3:
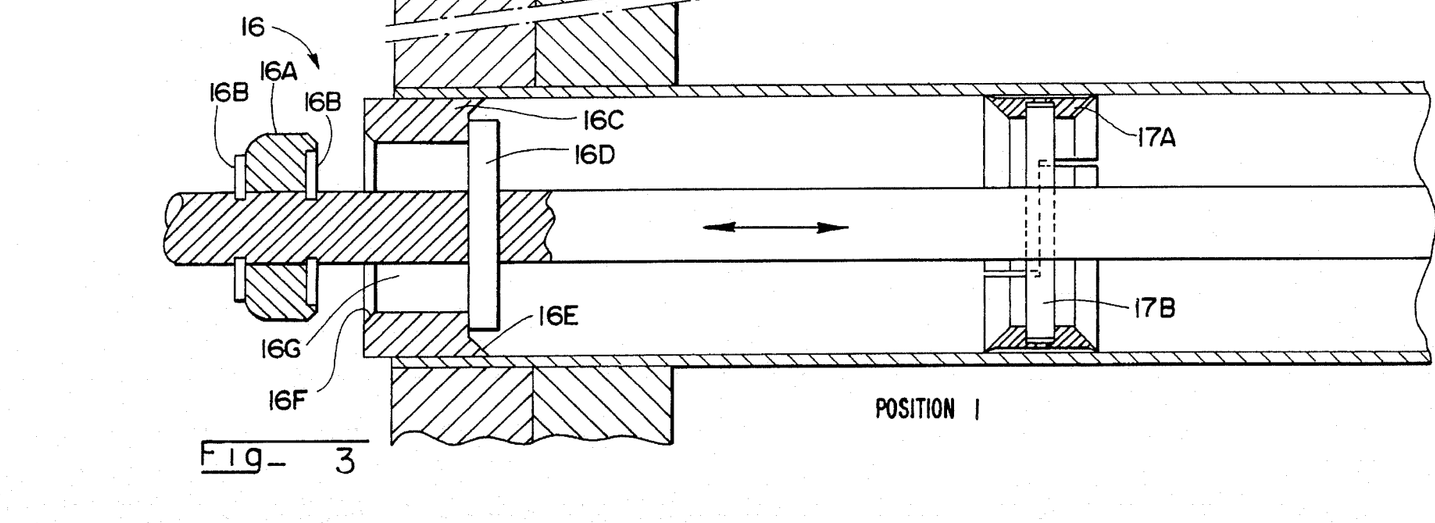
FIG. 3–6 are sectional views of the pump and scraper mechanism of the crystallizer of FIG. 2, each in a different event changing operating position.
Figure 3A:
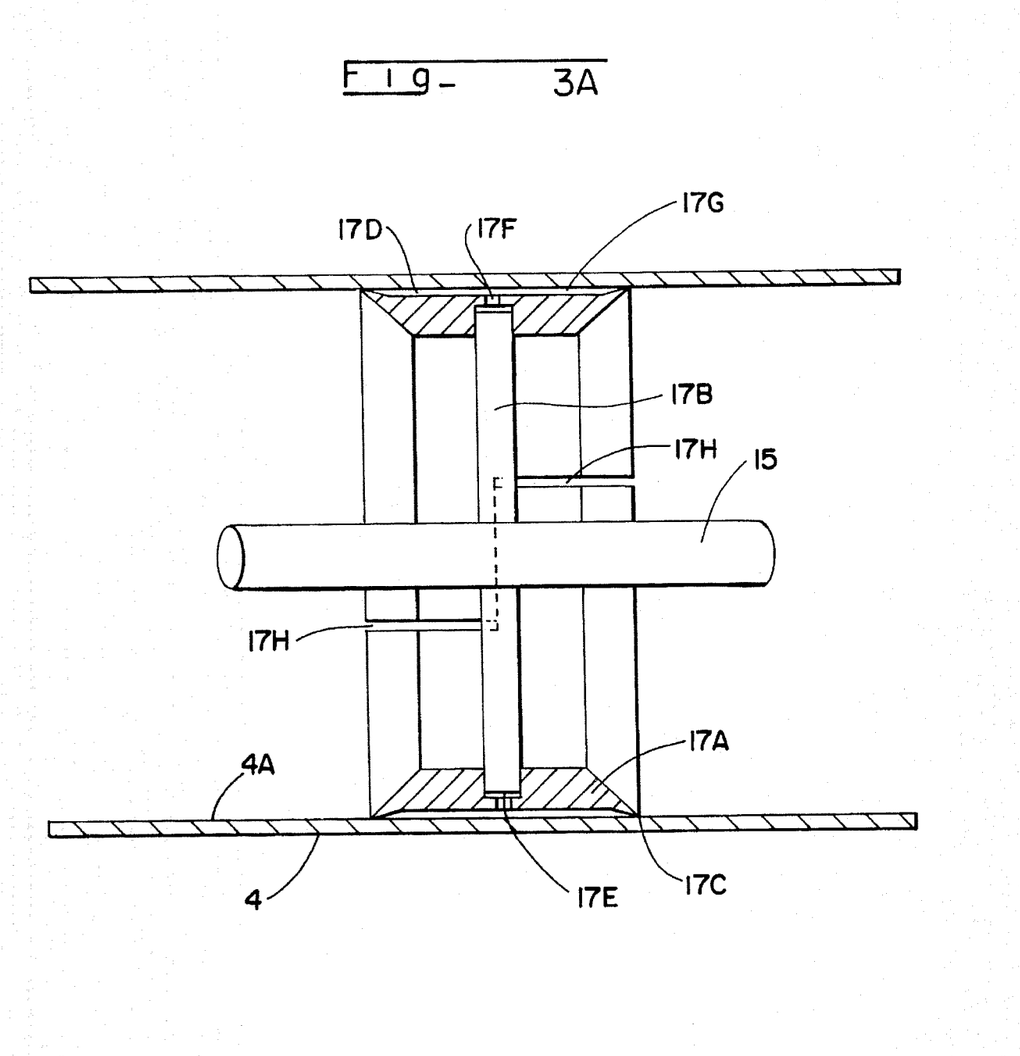
FIG. 3A is an enlarged sectional view of the ice scrapers shown in FIG. 3.
Figure 4:
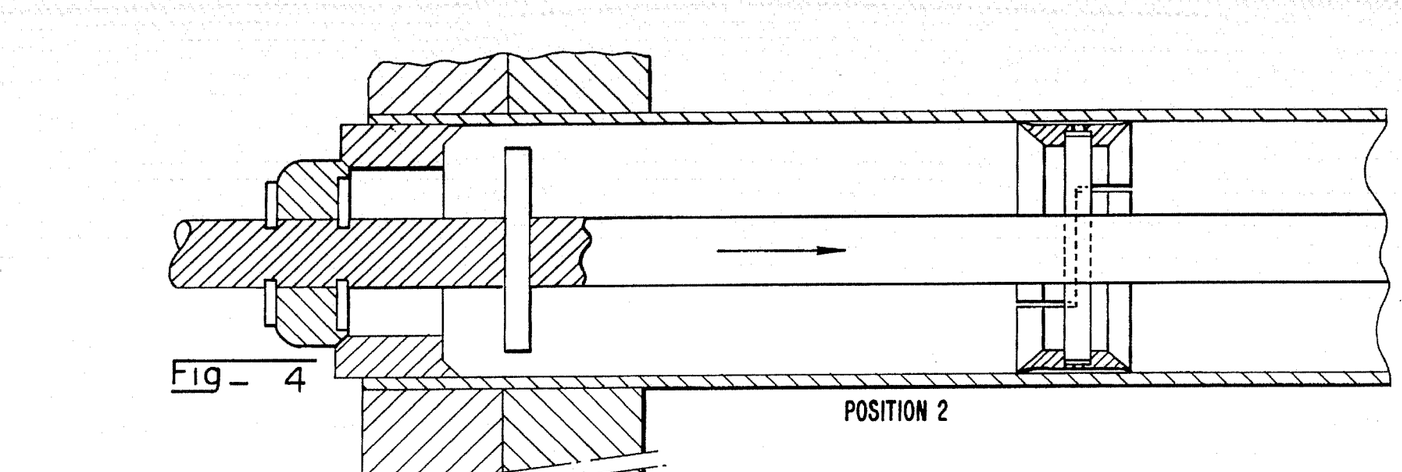
Figure 5:
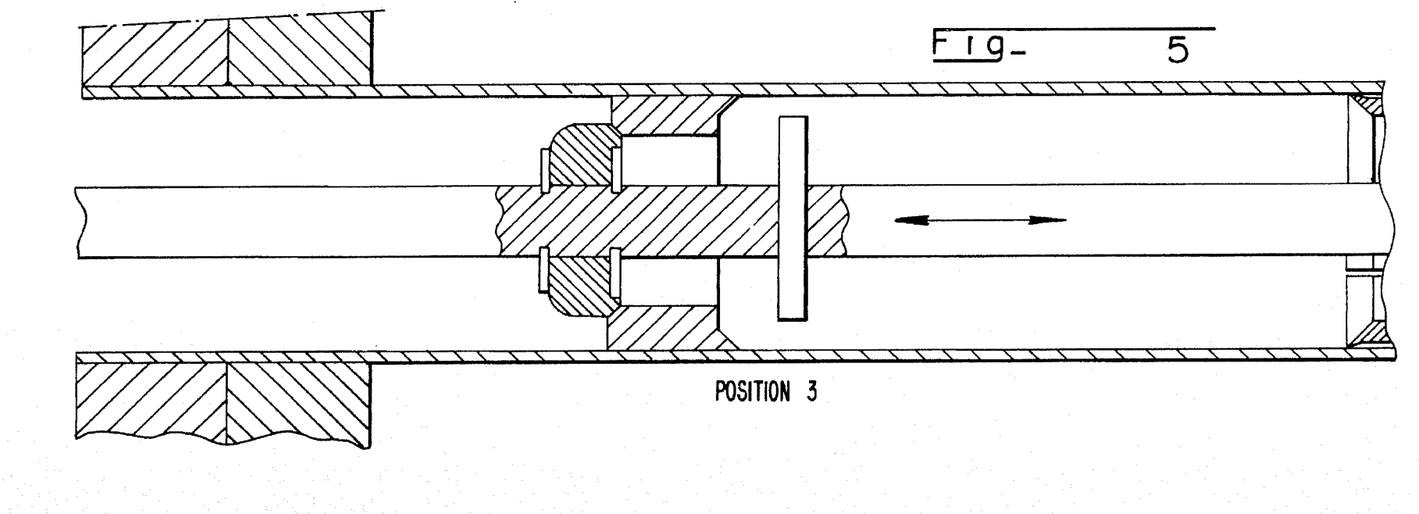
Figure 6:
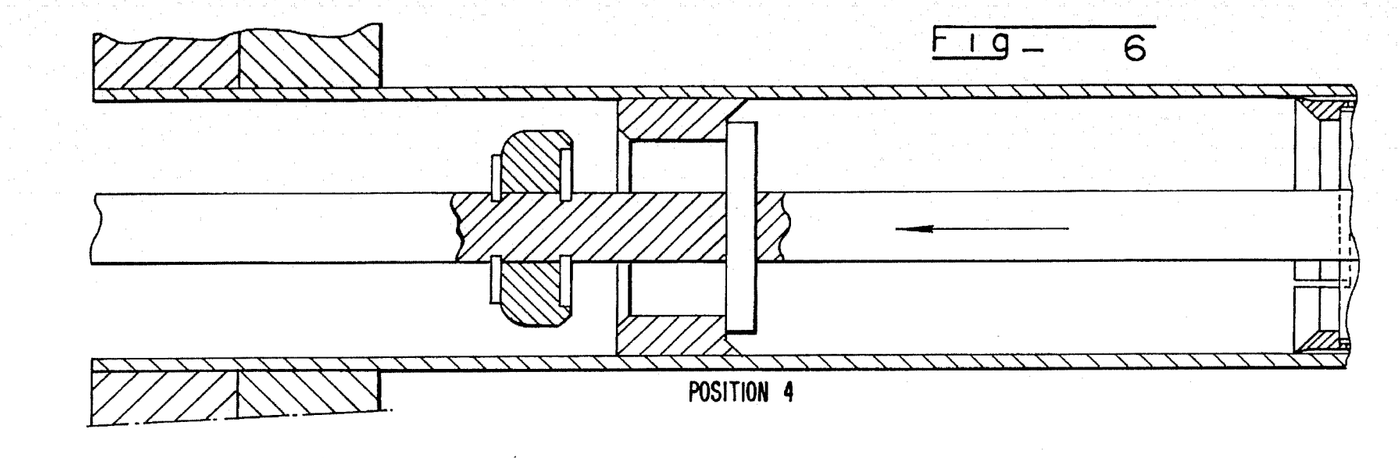

The inner side of the floating valve seat 16C has a scraper edge 16E to scrape ice from the inner surface of the tube in a manner similar to the fixedly mounted scraper rings. The outer side of the floating valve seat 16C is formed with a valving surface 16F communicating with the central opening 16G in the seat 16C. During the forward stroke, the rod, valve plug 16A, and pin 16D move relative to the floating seat 16C a short distance before the plug 16A abuts against and carries the floating seat 16C forward into the tube. (FIGS. 3–4). On the reverse stroke, the rod, pin 16D, and plug 16A move relative to the seat 16C a short distance before the pin 16D abuts against and carries the floating seat 16C backward out to the forward end of the tube. (FIGS. 5–6). As seen best in FIG. 4, on the forward stroke, the plug 16A fits snugly against the valving surface 16F, thereby forming a tight seal closing the central opening 16G to permit pressurization of the slurry by continued forward movement of the pump 16. On the reverse stroke, as seen best in FIG. 6, the valve plug is spaced-apart from the floating seat and pin 16D carries the floating seat back to its original position (see FIG. 3), thereby allowing the slurry to flow from the inlet head 8 through the central opening in the floating seat. The lost-motion connection between the valve plug 16A and the floating valve seat 16C forms the inlet valve for the pump. The opening 16G in valve seat 16C and the distance between valve plug 16A and valve seat 16C are designed to be large enough to prevent backflow of the slurry on the reverse stroke. In addition, a check valve shown schematically in FIG. 1 at 51A is provided in the inlet feed line to the head 8. The check valve permits the feed to flow freely into the inlet head 8 during the forward stroke of the pump, and prevents the feed from flowing backwards from the head 8 during the reverse stroke. In this way, consistent pumping is achieved by repeated cycles of the pump. Successful pumping of the ice crystal/concentrate slurry has been achieved with a scraping cycle of 5 to 10 seconds. It is known that at lower concentrations ice crystals are firmer and more difficult to remove, so at a low concentration the pumping frequency should be higher than the frequency at a higher concentration.

The feed stream is pumped through the tubes 4 and contacts the inner tube walls in the following manner. Assuming that the inlet head 8 and the wash column are large enough to fill the crystallizer with feed (if not the crystallizer must be primed), the position of the pumps 16 and scrapers 17 are as shown in position 1 of FIG. 3. After starting the reciprocating drive, the next position will be as shown in position 2 of FIG. 4 after which the liquid feed inside tubes 4 is forced through the tubes 4 since the inlet valve of the pump 16 is closed. The pressure in the inlet head 8 will diminish forcing the check valve 51A in the feed line to open and allow more ice-free feed to enter. This condition will continue until as shown in position 3 of FIG. 5, which is the end of the forward stroke and the beginning of the backward stroke. The first step in the backward stroke is shown in position 4 of FIG. 6 in which the inlet valve of the pump 16 is now open and the check valve 51A in the feed line closed. There will be no flow until position 1 has been reached and the cycle can repeat.

The flow created by the pumps 16 will exit the crystallizer through outlet B in head 12 as a mixture or slurry of ice crystals and a more concentrated liquid. As mentioned above, the cooled brine flow enters port C and flows counter-current to the feed through the shell as directed by the baffles 5 before the brine exits through port D. The tube walls, preferably constructed of a material with good heat-transfer capabilities such as metal, are cooled from the outside by the counter-current flow of chilled cooling brine. The heat transfer from the feed stream results in ice forming on the inner tube walls. The scraping and pumping mechanism drives the ice mixture forward until it reaches the outlet or discharge head 12, which may have a dish-like shape to minimize dead corners to prevent ice build-up.

The slurry of ice crystals and concentrate from the crystallizer is conducted to separator 52 where the ice crystals are separated from the concentrate. The separator of the invention can provide at least about 95% or more separation based upon centrifugal action without the use of screens or filters. The separator construction, shown in greater detail in FIG. 7, includes a rotatable drum 21, which may have an approximate length-to-diameter ratio of 1:1. The drum 21 is connected to one end of a hollow drive shaft 22 supported by a dual bearings 23A provided in an oil-lubricated pillow block 23, and is driven by a pulley 24 connected to the other end of shaft 22. A second drum 26 is sealingly mounted adjacent to the rotatable drum 21 on the opposite side of the hollow drive shaft 22 for rotation with drum 21. The second drum 26 may have a length-to-diameter ratio of approximately 1:10. The inside diameter of the two drums should be equal. The interiors of drums 21 and 26 are separated by a wall 25, which extends radially inward from drum 26. Wall 25 is perforated by a series of small holes 27 in its outer periphery that allow concentrate to flow from the interior of rotatable drum 21 into the interior of the second drum 26. The wall 25 has a central opening 25A, which may have a diameter equal to about one-half of the diameter of drum 21, to accommodate a rotatable auger 35 mounted to a second hollow drive shaft 32.

Figure 7:
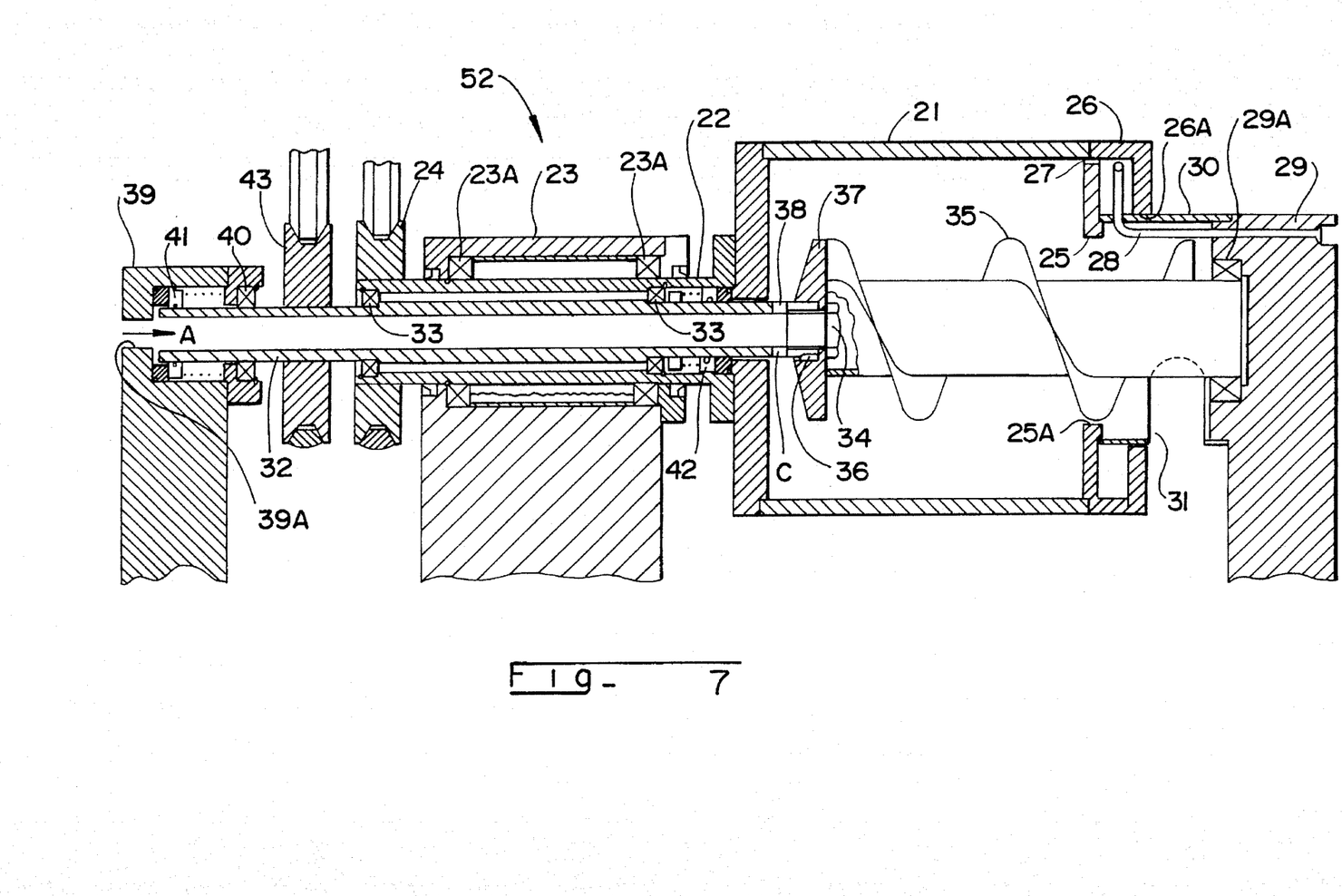
FIG. 7 is a longitudinal, partial sectional view of the ice separation apparatus of the invention (hereinafter referred to as "the separator"), illustrating the centrifugal separation chamber, auger, concentrate pump, drive mechanism, stationary members, and concentrate and ice crystal slurry feed port.

Shaft 32 is mounted inside the hollow drive shaft 22 and is supported by two spaced bearings 33 mounted between shafts 22 and 32. Shaft 32 extends into the rotatable drum 21 via an opening in the drum and is fixedly mounted to a supporting plate 37. Auger 35 is mounted to the opposite side of plate 37 for rotation therewith. A bolt 34 seals the end of shaft 32 and also connects the plate 37 and auger 35 to the shaft via a key 36. At the inner end of the bolt 34 a series of holes 38 are provided in shaft 32 that allow slurry conducted from the crystallizer via inlet port A in shaft 32 to enter the drum ill through the holes 38. The plate 37 on which one end of the auger 35 is mounted acts as a deflector plate, forcing the slurry entering through shaft 32 and holes 38 to be deflected to the outside of drum 21. A stationary block 29 has bearings 29A for supporting the other end of the auger. The entire separator unit 52 may be mounted to a base plate by its three stationary items, block 29, block 39 and pillow block 23.

The outer end of shaft 32 is connected to a second pulley 43 which drives shaft 32 and auger 35. Shaft 32 extends outwardly to another stationary block 39 having a bearing 40 supporting the shaft for rotation and a mechanical seal 41 for preventing slurry from leaking. The block 39 has an opening 39A, which is connected by piping or other suitable means to allow slurry to enter the device via inlet port Another mechanical seal 42 is installed on the outside of drum 21 between shaft 22 and shaft 32 to prevent backflow of slurry from dram 21 from entering the space between the shafts, thereby protecting the bearings 33. Both shafts may be driven with a single motor (not shown) mounted on top of pillow block 23 with a tension device for driving both pulleys 24 and 43, which may be of different size to provide different rotational speeds for the drum and auger. Any drive mechanisms capable of producing differential rotational speeds may be employed. For instance, the pulleys 24 and 43 could be connected to a conventional gearbox to facilitate adjusting the speeds of rotation of the two shafts.

When the motor is engaged, both shaft 22 and 32 will rotate, in turn driving the rotating drum 21 and the auger 35. The two shafts will rotate at different speeds, thereby providing for a scraping motion by the auger 35. The slurry of ice crystals and concentrate from crystallizer 52 (or another source of ice crystals/concentrate) is conducted via inlet port A, hollow shaft 32, and holes 38 to the rotatable dram 21. The openings in port A and shaft 32 are designed to prevent the ice crystals from separating from the concentrate until after the slurry is conducted through holes 38. The deflector plate 37 and the "G" forces generated from the rotating drum 21 direct the slurry toward the outside of the drum. The ice crystals are considerably less dense than the concentrate. The density of ice is lower than the density of water. Ice is 8.5 percent less dense than water; the density difference between ice and a concentrate of dissolved or suspended solids is even greater. As a result, when subjected to the rotation of the drum, a centrifugal effect is achieved and the slurry separates according to relative density of its components. The dram must rotate at a high enough rate to generate sufficient G-forces on the slurry to effect this separation. At present, it has been found that 500 to 1,000 G-forces are required to generate adequate separation of ice from concentrate, although the exact rotation requirement varies depending on the feed stream being treated, the percentage of crystallized ice in the slurry, and the viscosity of the concentrate. At these levels, the ice crystals separate from the concentrate and form a layer of ice crystals on the inside of an outer layer of liquid concentrate. As more slurry is added to the rotating drum 21, both the layer of concentrate and the layer of ice crystals grow inwardly until the ice crystals reach the edge of the auger 35. If the auger 35 is rotating at a different speed than the drum 21, the auger will begin scraping the ice crystals and removing them from the drum, as discussed below. The speed of rotation of the auger 35 will depend on the size difference between pulley 24 and pulley 43. The optimum speed of the auger 35 relative to the speed of the drum 21 depends on the material to be processed and may have to be adjusted for each application.

The outer layer of concentrate is directed through the series of small holes 27 and into the second drum 26. A stationary tube 28 is located inside drum 26, preferably positioned so that its opening is closely adjacent the inner surface of the drum and faces opposite the direction of drum rotation. The tube is connected to a fitting in the stationary block 29 that allows the tube 28 to be connected to the piping in the system for removing the ice-free concentrate. The concentrate is removed by pumping through tube 28 without exposure to air, avoiding the foaming problem discussed above. The concentrate removed from the separator 52 via tube 28 may be removed from the system or directed back into the crystallizer if it is desired to increase the concentration of the concentrate. Tests using a sugar solution of 50% by weight have shown that the separator of the invention, which solely employs density-based separation without the use of screens or filters, can achieve approximately 96% or higher removal of concentrate from ice crystals. In fluids in which the viscosity of the concentrate is lower than the sugar concentrate, the ice/concentrate separation could be as high as 98%.

The ice crystals scraped by the auger 35 are removed from the separator via an opening 26A in the end of the drum 26, which is sealed by a tube 30 fixedly attached to block 29 to prevent substances from entering the drum 26. The tube 30 may seal the opening 26A via a close fit as shown or a set of seals such as Teflon lip-seals may be employed (not shown). Tube 30 has a diameter slightly larger than the diameter of the auger 35 and an outlet opening 31 in the tube 30 is disposed outside the drum 26 through which the ice crystals exit. Thus, as auger 35 continues to operate, ice crystals and any remaining concentrate clinging to the ice crystals (preferably only 5% or less) exit the separator. The ice crystals may be conducted by a conventional auger or other suitable means along line 53 to the wash column for further washing and purification, as shown in FIG. 1.

The high removal rate of concentrate achieved by the separator of the invention greatly reduces the amount of concentrate entering the wash column with the ice crystals, which results in a liquid of lower overall concentration in the wash column. This promotes enhanced ice crystal growth in the wash column and more efficient overall separation as illustrated in the following example. Assuming that at a 40% ice fraction slurry is produced by the ice crystallizer and 96% of the concentrate is removed from the ice by the separator, only 5% of the concentrate will enter the wash column, which is 3% of the total flow. This is mixed with the incoming feed stream of 10% by weight, resulting in an overall concentration of the wash column of 11.5%. Without the ice separator, the full flow from the crystallizer will enter the wash column resulting in a 40% overall concentration of the wash column. Since a wash column is also a gradient device, with concentrated fluid on one side and water on the other side, the wash column used in the system of the invention has a great advantage over the same wash column used without the separator of the invention. Wash columns of this kind have shown good results up to 25% to 30% concentration, but do not operate reliably at concentrations higher than 30%. As shown above, the concentration in the wash column will never get close to the critical concentration when used with the ice separator of the invention.

The ice crystals conducted to the wash column 50 also act to cool the incoming feed stream as it passes over the ice crystals. The crystals then exit the wash column through line 66, are converted to water at heat exchanger 54, and the purified water exits the system at 67.

What is claimed is:

1. An apparatus for creating a slurry of ice crystals and liquid concentrate from a liquid feed stream comprising:

an outer shell having an inlet for receiving a liquid feed stream and an outlet for conducting a slurry of ice crystals and liquid concentrate produced therein away from the shell;

at least one tube supported inside and spaced from the shell to define a clearance space between said at least one tube and the shell, said tube having an inner surface, an outer surface, and an interior, said clearance space being sealed from the interior of said at least one tube, and containing a coolant having a temperature at or below the freezing point of the liquid feed stream;

an inlet valve associated with each tube for conducting liquid feed from the inlet to the interior of the tube;

a scraper mechanism supported within each tube for reciprocal motion, said scraper mechanism simultaneously removing ice crystals formed on the inner surface of the tube, combining the ice crystals with the liquid concentrate stream disposed in the tube to form a slurry of ice crystals and concentrate, and pumping the slurry, through the tube as the scraper mechanism reciprocates within the tube.

2. The apparatus of claim 1, wherein the scraper mechanism comprises:

a rod positioned axially within said tube;

a piston attached to the rod by a lost motion connection for pressurizing and pumping the slurry in the tube; and at least one scraper ring carried by one of the rod and piston slideably positioned within the tube for removing ice crystals from the inner surface of the tube during reciprocation of the rod.

3. The apparatus of claim 2, wherein the inlet valve comprises:

a valve member carried by the rod;

a valve seat formed on the piston for sealingly mating with the valve member to close the inlet valve and permit the piston to pressurize the tube, said inlet valve being open when the valve member and valve seat are spaced from each other.

4. The apparatus of claim 1 further comprising a plurality of scrapers carried by the rod disposed inside the tube so that the entire inner surface of the tube is scraped as the scraper mechanism reciprocates within the tube.

5. The apparatus of claim 4 wherein the scrapers comprise annular members fixedly mounted to the rod.

6. The apparatus of claim 5 wherein the annular members include an outer surface biased against the inner surface of the tube, said outer surface having opposed edges and a middle portion spaced from the inner surface of the tube to define an annular chamber in which ice may collect as the scraper mechanism reciprocates, and further comprising means for conducting ice away from said annular chamber.

7. The apparatus of claim 1, further comprising a plurality of tubes supported inside and spaced from the shell, and baffle members for directing the flow of coolant around the tubes so that coolant is in direct contact with the entire outer surface of said tubes, regardless of the orientation of the apparatus.

* * * * *